United States Patent [19]

Campbell et al.

[11] 4,259,900
[45] Apr. 7, 1981

[54] ROTARY BALING MACHINE HAVING DUAL BELT DRIVING MEANS WITH OVERRUNNING SPROCKET

[75] Inventors: Hallis D. Campbell; Donald E. Burrough; Dean E. Seefeld, all of West Bend, Wis.

[73] Assignee: Gehl Company, West Bend, Wis.

[21] Appl. No.: 95,401

[22] Filed: Nov. 19, 1979

[51] Int. Cl.³ .............................................. B30B 5/04
[52] U.S. Cl. ..................................... 100/88; 56/341; 198/834
[58] Field of Search ............... 100/88, 5; 56/341, 342, 56/343; 198/834, 835; 192/104 C, 103 B

[56] References Cited

U.S. PATENT DOCUMENTS

| | | | |
|---|---|---|---|
| 2,005,486 | 6/1935 | Wilson | 192/104 C |
| 2,749,696 | 6/1956 | Innes | 192/103 B X |
| 3,914,926 | 10/1975 | Braunberger et al. | 56/341 |

Primary Examiner—Peter Feldman
Attorney, Agent, or Firm—James E. Nilles

[57] ABSTRACT

A rotary baling machine for forming large cylindrical bales of cut crop material, such as hay which uses a conveyor belt and an oppositely moving containing belt means arranged to rotate the hay and form the bale in a baling compartment as the machine moves over the crop being harvested. The endless containing belt means surrounds the bale as it progressively increases in size and acts to compact the crop being baled to thereby form a bale of proper density. This containing belt means is trained over suitable elongated rollers which extend across the machine and thereby acts to rotatably drive the rollers. Power means are also provided, such as chain and sprocket means to also power drive the rollers. An overrunning sprocket is provided on at least one of the rollers so that possible over-loading or slack in the containing belt means which is caused by differential belt driving speeds, is eliminated.

4 Claims, 6 Drawing Figures

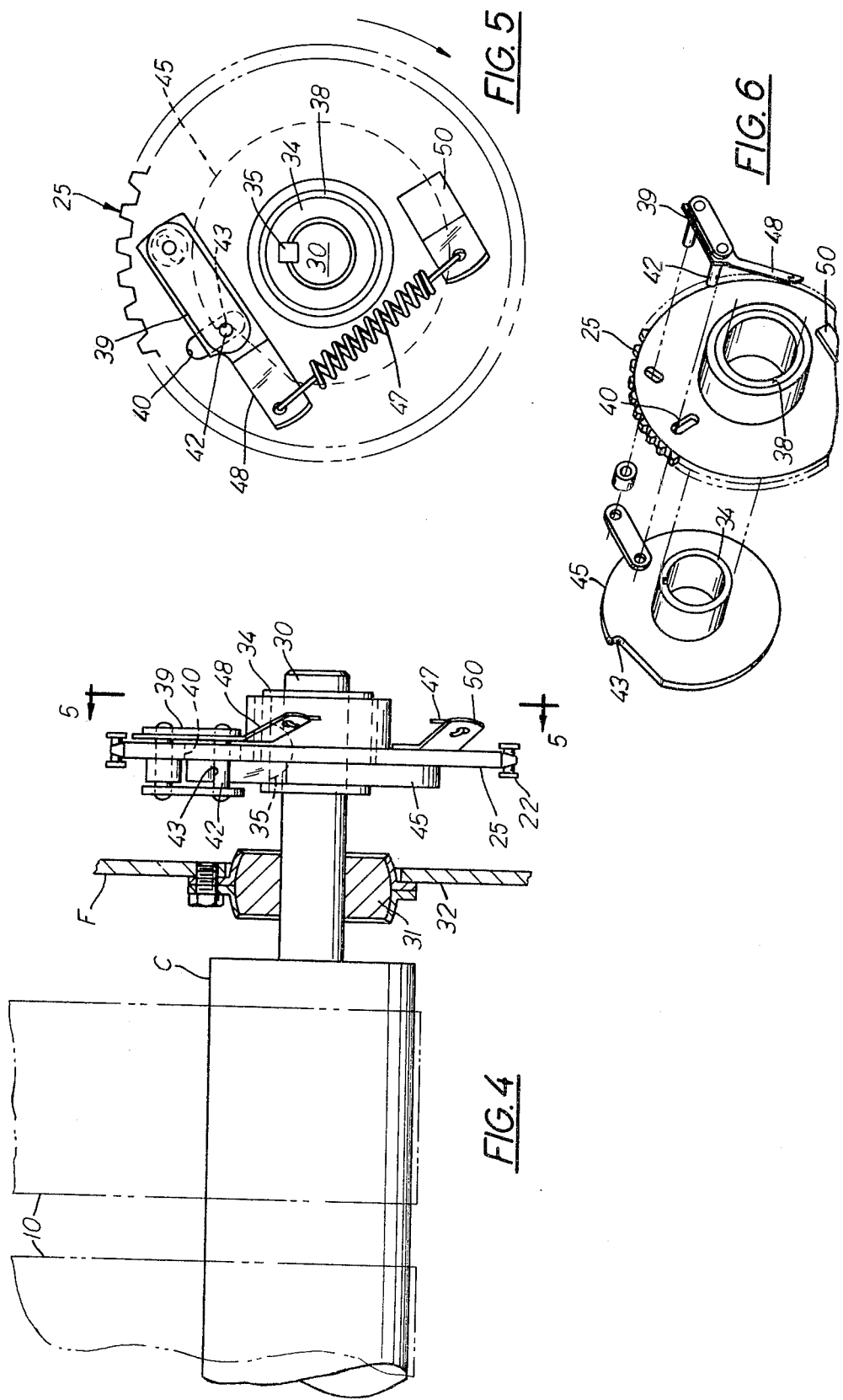

ROTARY BALING MACHINE HAVING DUAL BELT DRIVING MEANS WITH OVERRUNNING SPROCKET

BACKGROUND OF THE INVENTION

The present invention relates to machines which move over the field and form the cut crop into large cylindrical bales. One baling machine of this general type is shown in the U.S. Pat. No. 3,914,926 issued Oct. 28, 1975 and which has been assigned to an assignee common with the present invention.

In such baling machines hay is received by the baler between a feed or packer roller and a conveyor belt and pressed into a flat, thin mass from which it passes to a core forming area where it is rolled between the conveyor belt and the flight of an oppositely moving belt arrangement. Thereafter, the thin mass of hay is rolled about the core into a bale which continues to increase in size until the desired size is achieved. During its formation, the bale is formed in a zone in which the bale is confined between the belts and the feeder roller.

In such balers the growing bale deflects and enlarges the length of the belt flight in the bale forming zone, and the increase in length must be accommodated by a mechanism which also serves to maintain the bale forming belt flight tight to apply compacting force to the bale.

The bale forming endless belt located generally in the upper part of the machine is commonly referred to as the containing belt means and consists of a plurality of side-by-side arranged individual belts which are trained around the supporting rollers. The tensioning of this upper belt means may be accomplished by the subject matter shown in the co-pending U.S. Pat. application Ser. No. 69,997, filed Aug. 27, 1979 and which has been assigned to an assignee common with the present invention.

Due to the fact that the rollers around which the containing belt means are trained are driven by two forces, that is they are driven by the containing belt means itself as well as being power driven by sprocket and chain means on occasion differential driving speeds are imparted to the rollers. In other words, the driving speed of the belt means and the sprocket and chain means is not always synchronized and in fact one varies from another depending on different circumstances such as dimensional tolerance differences in the roller diameters. The problem is particularly aggravated at that roller about which the wrap of the belt means is varied as the bale grows in size and also due to the fact that the pressure exerted by the bale being formed varies to cause varying pressure imparted to the bale means and against that particular roller. This prior art arrangement resulted in high horsepower requirements, excessive heating of the chains, over-loading of the belts due to the tension in them and excessive deflection loads on the roller shafts themselves.

SUMMARY OF THE INVENTION

The present invention provides an improved baling machine for forming cylindrical bales and which utilizes endless containing belt means which is continually wrapped around the bale being formed as the latter progresses in diameter. This containing belt means is trained around and drives rollers, which rollers are also positively driven by endless chain means that are trained around sprockets which are rigidly secured to the rollers. Thus, the rollers are deiven by both the containing belt means and by the sprocket and chain means. An overrunning sprocket is provided for one of the rollers, which roller is located adjacent the bale forming chamber and about which the wrap of the containing belt means is varied as the bale changes in diameter. The overrunning clutch thus accommodates any differences in driving speeds between the containing belt means and the sprocket and chain means that may occur from time to time. The result is the elimination of over-loading in the containing belt means or the elimination of looseness in said containing belt means. The rollers are thereby provided with sufficient force to insure their rotation throughout the baling cycle and without excessive power requirements, heating of the chains, over-loading of the belt means due to excessive tension and over-loading and deflection of the rollers and their bearings.

These and other objects and advantages of the present invention will appear hereinafter as this disclosure progresses, reference being had to the accompanying drawings.

THE DRAWINGS

FIGS. 4, 5 and 6 are views of the overrunning clutch provided by the present invention; FIG. 4 being a fragmentary sectional view taken transversely through the machine; FIG. 5 being a view taken generally along the line 5-5 in FIG. 4 and FIG. 6 being a fragmentary, perspective exploded view of certain portions of the overrunning sprocket.

DESCRIPTION OF A PREFERRED EMBODIMENT

Figure 1:
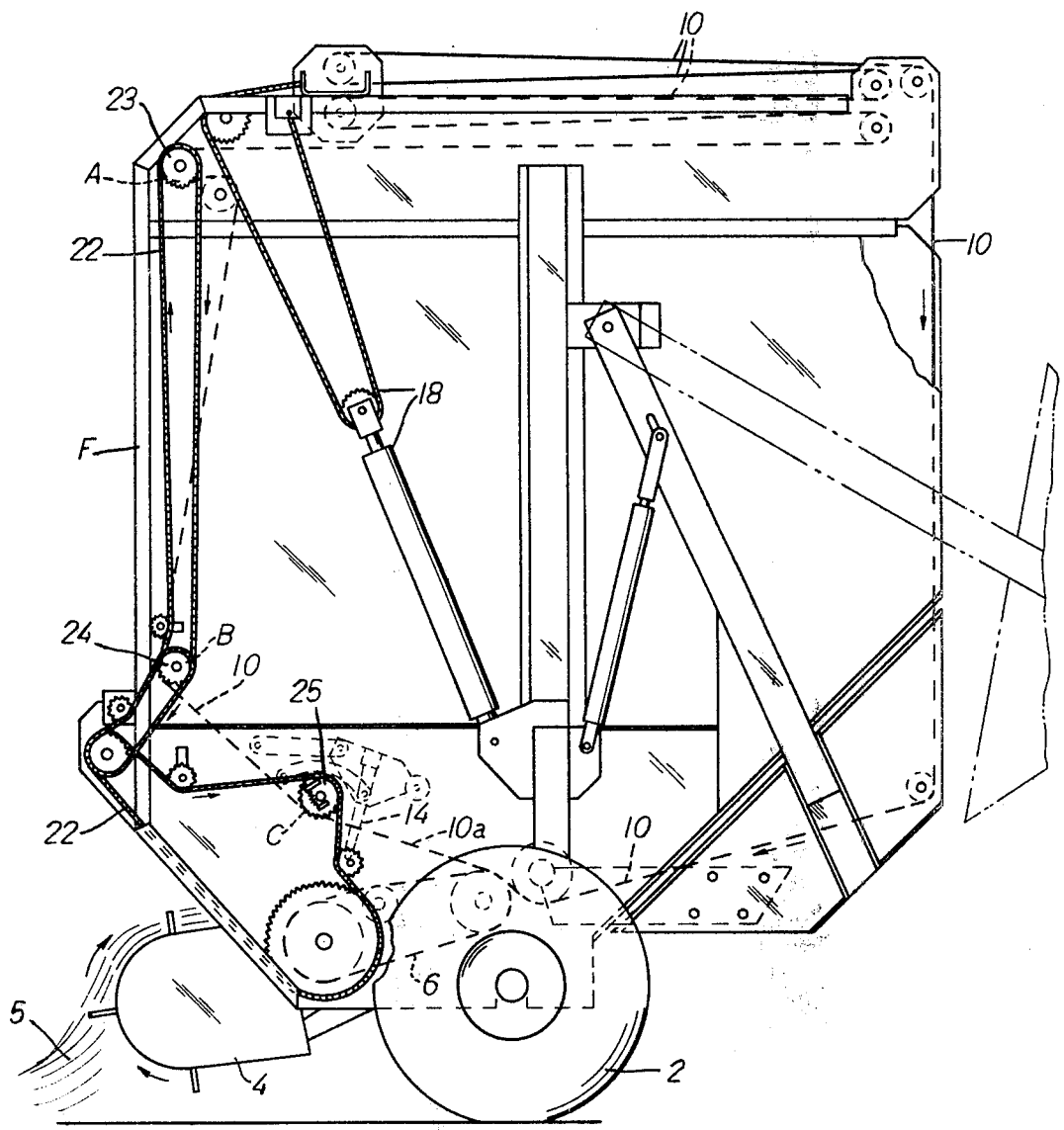
FIG. 1 is a side elevational view of a baling machine embodying the present invention.
Figure 2:
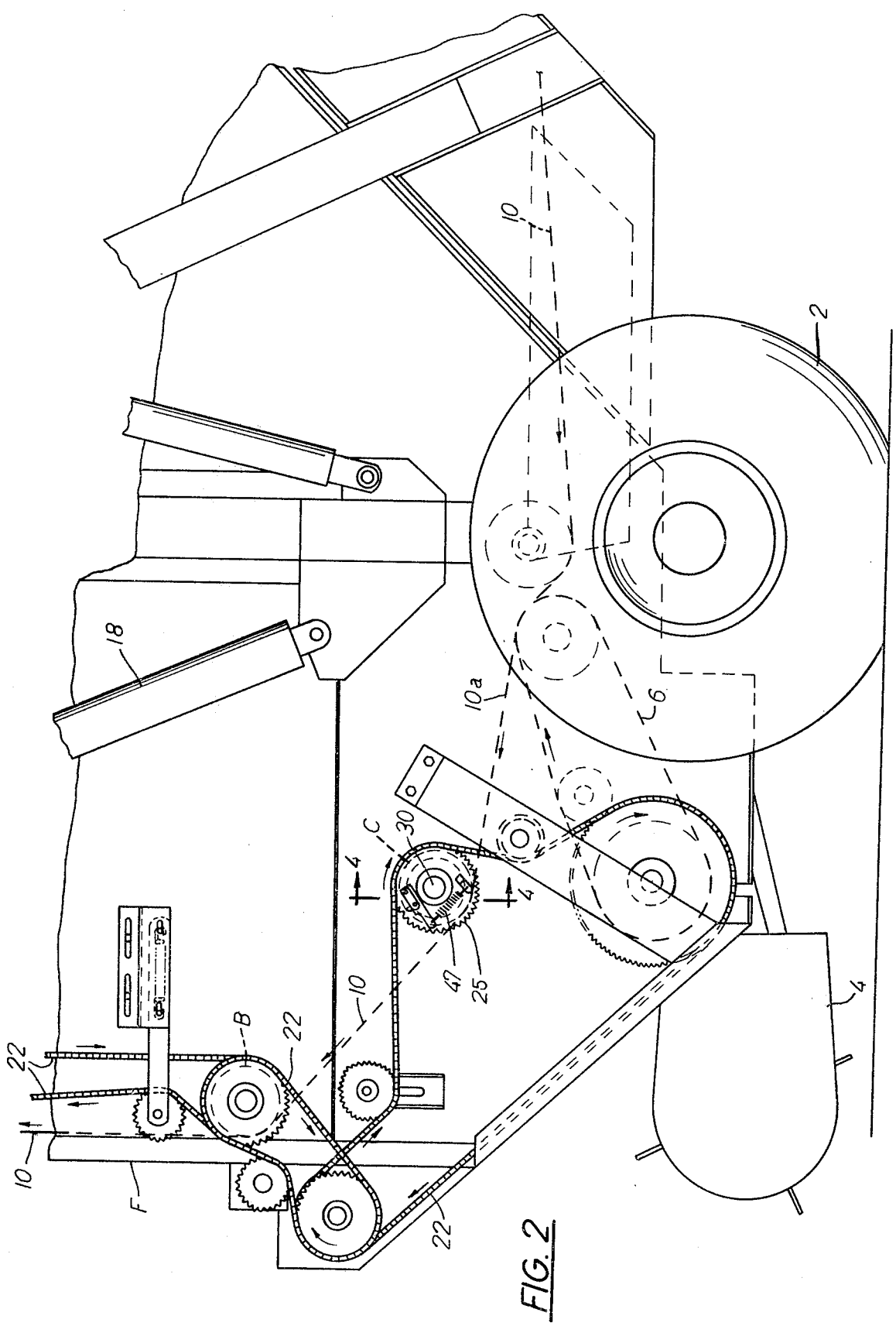
FIG. 2 is an enlarged, fragmentary view of the lower portion of the machine shown in FIG. 1.

The general organization of the baling machine shown in FIG. 1 includes the machine frame F which is mounted on a pair of transversely spaced apart ground wheels 2 and which is adapted to be pulled over the crop material to be baled by a tractor and drawbar arrangement, not shown, but reference may be had to the said U.S. Pat. No. 3,914,926 for further details as to the general construction of the baler if deemed to be necessary or desirable. The crop pick-up mechanism 4 at the forward side of the baler acts to lift the crop material 5 off the ground and feed it in the direction of the curvilinear arrow rearwardly between the lower conveyor belt 6 and the driven packer roller 8. A containing belt means 10 is trained around various rollers located transversely across the machine frame and which are supported in suitable anti-friction bearings, not show. This belt means, as previously indicated, is comprised of a seriew of individual endless belts arranged in side-by-side relation, the construction and arrangement of which is shown in detail in the said U.S. Pat. No. 3,914,926. The incoming crop material is fed between the lower belt conveyor 6 and the containing belt means 10 and is held captive therein as the material is rotated and formed into a cylindrical bale in the known manner. As shown in FIG. 2, the lower flight 10a of the belt means 10 extends generally directly across the upper portion of the conveyor belt 6 but as the bale 12 (FIG. 3) grows in size, the belt means 10 also grows to be maintained in tightly wrapped relationship around the bale being formed. By way of general background, bale forming fingers 14 (FIGS. 1 and 3) are provided for maintaining the hay captive in the baling chamber during early stages of bale formation and as described in the said U.S. Pat. No. 3,914,926. Hydraulic control means indicated generally at 18 (FIG. 1) are also provided for maintaining proper tension in the belt means during all stages of bale formation and reference may be had to the said U.S. Pat. application Ser. No. 69,997 if a more complete description of that control means is deemed to be necessary or desirable.

Figure 3:
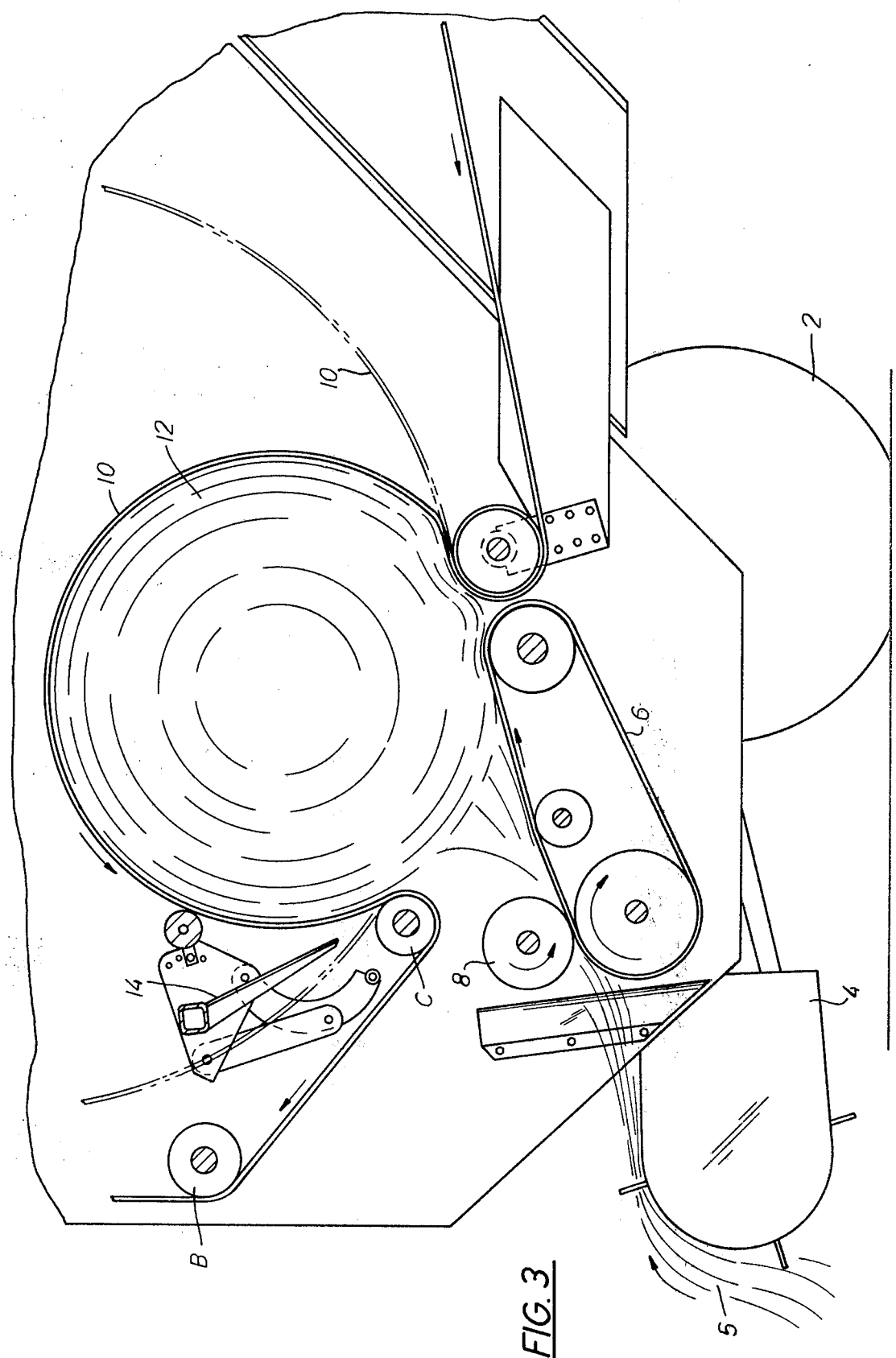
FIG. 3 is a view similar to FIG. 2, but being a longitudinal vertical view through the machine to clearly show the bale forming belt.

As previously mentioned, a number of transversely arranged rollers are provided across the machine and about which the containing belt means is trained and these various rollers have been shown clearly in FIG. 1 and are described as to their structure and function in the said U.S. Ser. No. 69,997. Three of these rollers, A, B and C are driven by endless chain means 22 which are trained around and drive the sprockets 23, 24 and 25, that are fixed, respectively, to the end of rollers A, B and C. Rollers B and C are steel rollers. Roller A is the main driving roller and is of a diameter slightly larger than rollers B and C. In addition, roller A is a rubber covered roller and has a roughened surface. In addition, rollers B and C are driven by the containing belt means wrapped therearound. In this manner, the rollers B and C have dual drives, that is to say they are driven or rotatably powered by the containing belt means and also by the sprocket and chain means and under some circumstances, differential speed is thereby attempted to be imparted to these rollers. Due to manufacturing tolerances in the manufacture of these rollers, the containing belt means may drive them at slightly different speeds. This difference in driving speeds is particularly troublesome in connection with the roller C because of the varying driving forces on that roller. These varying driving forces are due to the fact that the belt means 10, when in the position shown in FIG. 2, is not wrapped around the roller C to any great extent whereas when the bale has been formed to an appreciable size, as shown in FIG. 3 the belt means is wrapped around the roller C to a greater extent with an excessively greater driving force thereon. Furthermore as the size of the bale increases, the pressure exerted by it against the belt means acts to create greater driving force of the belt means on the roller C. The above arrangement can result in overloading of the various parts on the machine and require excessive horsepower. This overloading often excessively heats the chains, overloads the belts because of excessive tension in them and overloads and deflects the rollers themselves, all of which are detrimental to the functioning and life of these parts.

In accordance with the present invention, and overrunning member 25 is utilized in connection with at least one of the rollers and preferably roller C because of the varying loading conditions which it encounters during operation of the machine. While an overrunning member may be also utilized, for example with roller B, the invention will be described only in connection with roller C where it finds particular utility. This member in the form of an overrunning sprocket 25 is shown in FIGS. 4, 5 and 6 and is located on one end of the shaft 30 of the roller C. The shaft 30 is suitably journalled, as previously mentioned, in anti-friction bearings, for example, bearing 31 mounted in the side frame 32 of the machine frame F.

The overrunning sprocket includes a hub 34 which is secured to shaft 30 by a key 35. Hub 34 has a ratchet wheel 45 rigidly secured thereto. The driven sprocket 25 is rotatably mounted in the hub 34 on a bearing 38. A pawl 39 is pivotably mounted in a slot 40 in the sprocket by means of a pin 42 and is adapted to engage a notch 43 in a ratchet wheel 45. A biasing spring 47 is connected between a plate 48 attached to the pawl and there is a bracket 50 secured to the side of the sprocket. When the sprocket is being driven at a constant speed by the chain means 22, the tension of the spring is sufficient to keep the pawl engaged with the notch and therefore driving force is transmitted from the sprocket to the shaft. However, when the shaft is driven faster by the belt means 10, the notch moves away from the pawl and the sprocket freely overruns.

Thus, during certain circumstances as for example, early stages of bale formation, the roller C is driven by the chain and sprocket but as the driving force of the belt means increases, the belt means takes over to drive the roller as the sprocket overruns, thereby eliminating any drive conflict between the sprocket and chain drive and the belt means drive. As a result, the proper tension in the belt means is maintained.

By having an overrunning cluth means on the roller chain for roller C and by having the main driving roller A with a slightly greater peripheral speed than roller C, the possibility of having tightness in the upper containing belts from an undersize roller C or the possibility of having loose upper containing belts from an oversize roller C is eliminated. In other words, the slightly larger diameter on the roughened rubber covered, main drive roller A, where the redundently driven rollers B and C are ahead of the main drive roller A, insures that the overrunning or slipping clutch on roller C will overrun as necessary as long as the belt means provides sufficient force to rotate these rollers. In this manner, roller A of a slightly oversize diameter, and which has slightly more wrap of the belt means therearound than do rollers B and C, when used in conjunction with overrunning or slipping clutch on roller C insures that the belt means between the rollers cannot be slack or tight due to different peripheral roller speeds.

We claim:

1. A machine for forming a cylindrical bale of cut crop material comprising, a mobile frame, a series of rollers mounted in and extending transversely across said frame, endless belt means trained around and supported on said rollers and defining a bale forming chamber wherein the belt means is continually wrapped around the bale being formed, whereby said belt means drivingly rotates said rollers, second means operatively connected with said rollers for also rotatably driving said rollers, said second means including an overrunning member on at least one of said rollers, whereby when said member overruns, said belt means can drive said one of said rollers independently of said second means.

2. A machine for forming a cylindrical bale of cut crop material comprising, a mobile frame, a series of rollers mounted in and extending transversely across said frame, endless belt means trained around and supported on said rollers and defining a bale forming chamber wherein the belt means is continually wrapped around the bale being formed, whereby said belt means drivingly rotates said rollers, one of said rollers having the wrap of said belt means increased therearound as said bale diameter is increased, whereby the driving force of said belt means on said one of said rollers increases, second means operatively connected with said rollers for also rotatably driving said rollers, said second means including an overrunning member on said one of said rollers, whereby when said member overruns, said belt means can drive said one of said rollers independently of said second means.

3. A machine for forming a cylindrical bale of cut crop material comprising, a mobile frame, a series of rollers mounted in and extending transversely across said frame, endless belt means trained around and supported on said rollers and defining a bale forming chamber wherein the belt means is continually wrapped around the bale being formed, whereby said belt means drivingly rotates said rollers, sprocket and chain means operatively connected with said rollers for also rotatably driving said rollers, said sprocket and chain means including an overrunning sprocket on at least one of said rollers whereby said belt means can drive said one of said rollers independently of said sprocket and chain means when said overrunning sprocket overruns.

4. A machine for forming a cylindrical bale of cut crop material comprising, a mobile frame, a series of rollers mounted in and extending transversely across said frame, endless belt means trained around and supported on said rollers and defining a bale forming chamber wherein the belt means is continually wrapped around the bale being formed, whereby said belt means drivingly rotates said rollers, sprocket and chain means operatively connected with said rollers for also rotatably driving said rollers, one of said rollers having the wrap of said belt means increased therearound as said bale diameter is increased, whereby the driving force of said belt means on said one of said rollers increase, said sprocket and chain means including an overrunning sprocket on said one of said rollers whereby said belt means can drive said one of said rollers independently of said sprocket and chain means when said overrunning sprocket overruns.

* * * * *